Oct. 22, 1946.  G. R. SCHWEBS  2,409,988
FISHING ROD INDICATOR
Filed June 8, 1945
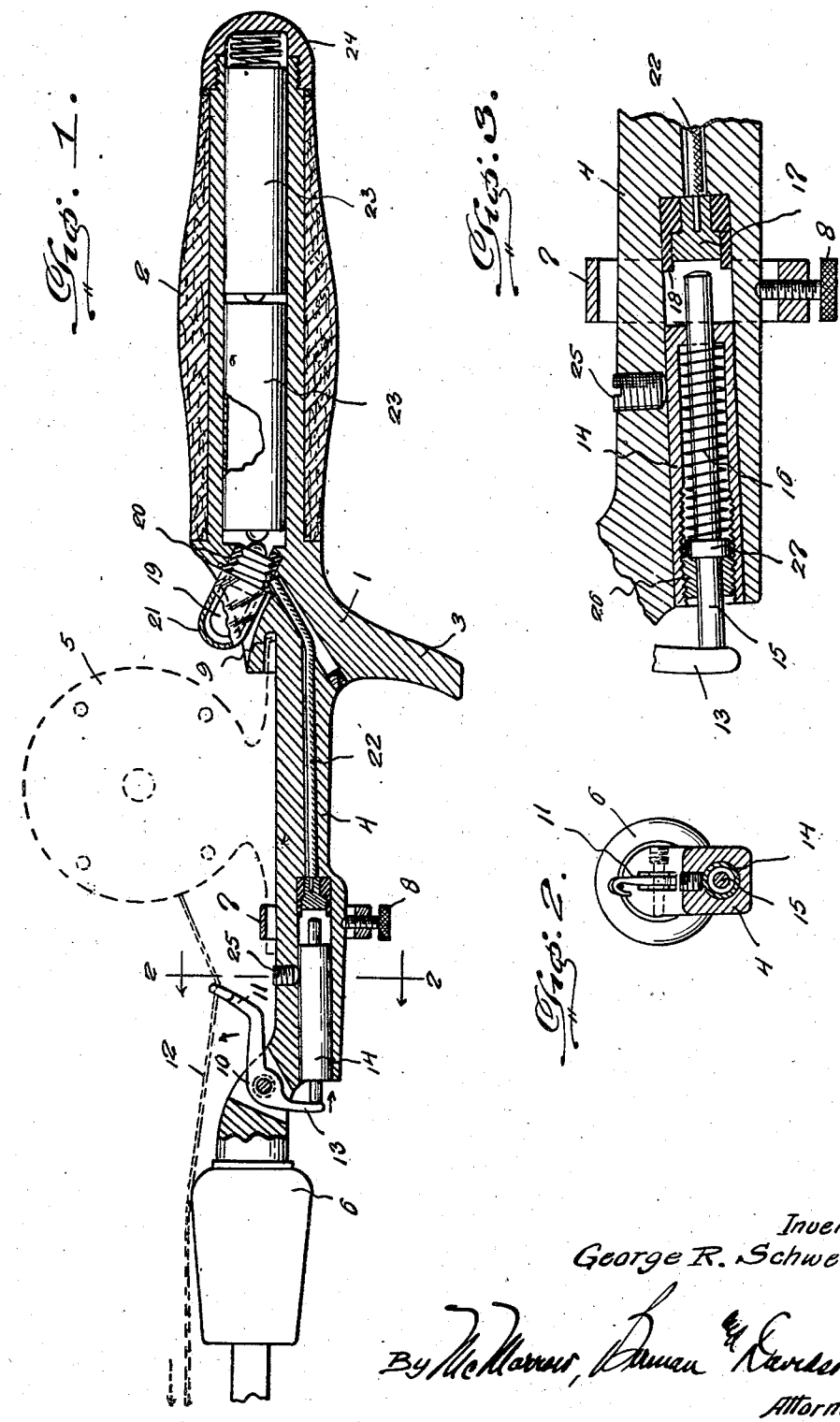
Inventor
George R. Schwebs.
By McManus, Inman & Vandern
Attorneys Patented Oct. 22, 1946

2,409,988

UNITED STATES PATENT OFFICE 2,409,988

FISHING ROD INDICATOR

George R. Schwebs, Cleveland, Ohio

Application June 8, 1945, Serial No. 598,238

6 Claims. (Cl. 43—17)

This invention relates to fishing rods, and more particularly, to a fishing rod having an indicator device for signalling the presence of a fish on the line.

A main object of the invention is to provide a novel and improved indicator device for a fishing rod wherein the presence of a fish on the line is indicated by the flashing of a lamp mounted on the rod handle.

A further object of the invention is to provide an improved fish indicator of the flashing lamp type for a fishing rod wherein a positive actuation of the signal device responsive to the presence of a fish on the line is obtained.

Further objects and advantages of the invention will appear from the following description and claims, and the accompanying drawing, wherein:

Figure 1 is a longitudinal cross-sectional view of the handle portion of a fishing rod provided with the indicator structure of this invention.

Figure 2 is a cross-sectional view taken on line 2—2 of Figure 1.

Figure 3 is a detail cross-sectional view of the switch device employed with the indicator structure of Figure 1.

Referring to the drawing, 1 designates the handle of a fishing rod, said handle comprising a rear gripping portion 2, a finger post 3, an intermediate portion 4 to which a reel 5 is adapted to be secured, and a forward end portion 6 which is secured to the shank of the fishing rod.

Intermediate portion 4 is slightly offset from the remaining portions of the handle and is formed to provide a seat for the base of reel 5. A clamp member 7 embraces intermediate portion 4 and is provided with a set screw 8 for clamping member 7 firmly with respect to portion 4 to rigidly secure the front flange of the reel base to its seat on said portion 4. An appropriate rear recess 9 is provided for receiving the rear flange of the reel base.

Pivotally mounted adjacent the forward end of portion 4 is a lever 10 having a rearwardly and upwardly extending arm 11 formed with a hook adapted to slidably engage the fishing line 12. Lever 10 is also formed with a depending arm 13. Mounted in a cylindrical recess formed adjacent the forward end of portion 4 is a barrel member 14 containing an elongated plunger 15 mounted for longitudinal movement in said barrel member and biased to a forward position wherein it contacts arm 13 by a coil spring 16. Positioned in the rearward end of the cylindrical recess is a contact 17, said contact being insulated from portion 4 by an insulating bushing 18. Spring 16 normally maintains the rearward end of plunger 15 spaced from contact 17, said plunger being adapted to be moved into contact therewith responsive to counterclockwise rotation of lever 10. This occurs when a pull is exerted on fishing line 12.

Mounted in the rearward end of portion 4 behind reel 5 is a flashlight lamp 19 secured in an insulating bushing 20. Lamp 19 is covered by a colored translucent shield 21 appropriately secured thereto. The shell portion of the lamp base is connected to contact 17 by an insulated conductor 22 contained within a passage provided therefor in portion 4 of the rod handle. The center contact of the lamp base is in abutment with the center contact of the end cell of a series of flashlight batteries 23 contained within gripping portion 2 of the rod handle. An end cap 24 is provided on gripping portion 2 for grounding the casing of the rearward battery cell to the handle and providing access to the battery compartment.

It can be readily seen that when plunger 15 touches contact 17 the lamp base shell is grounded and the lamp circuit is closed. Thus, when a pull is exerted on fishing line 12 the lamp becomes illuminated. This informs the fisherman that a fish is on the line.

As shown in Figure 1, arm 11 is of such configuration that line 12 is deviated downwardly by the hook on arm 11 out of its straight line direction with respect to the shank of the rod. When line 12 is in tension a substantial force is applied to lever 10, causing it to rotate against the pressure of spring 16. The sensitivity of the action may be adjusted by shifting the position of barrel 14 in its recess, a set screw 25 being provided for securing the barrel in a desired position in said recess.

The location of lamp 19 with respect to the reel 5 is such that forward illumination is substantially blocked by the reel and the indicator is visible only from the rear. This prevents disturbing forward illumination in night fishing which might interfere with others fishing nearby. The shield 21 also aids in cutting down the intensity of the signal flash. Said shield may be of an appropriate color such as amber, red or green, for providing effective signal indication either at night or in daylight.

The biasing pressure of spring 16 may be regulated by adjusting a nut member 26 in barrel member 14, said nut member forming the front stop for a collar 27 provided on plunger 15 on which spring 16 bears.

While a specific embodiment of a fishing rod indicator device has been disclosed in the foregoing description, it will be understood that numerous modifications within the spirit of the invention may occur to those skilled in the art. Therefore it is intended that no limitations be placed on the invention other than as defined by the scope of the appended claims.

What is claimed is:

1. In a fishing rod handle, a forward portion, an intermediate portion and a rearward portion, said intermediate portion being offset with respect to said forward portion and said rearward portion, a lever member pivotally mounted on said intermediate portion, said lever member being provided with a rearwardly extending arm adapted to slidably engage the fishing line and deviate it downwardly, and signal means on said handle adapted to be energized responsive to upward movement of said rearwardly extending arm caused by a pull on said line.

2. The structure of claim 1, and wherein said signal means is a flashlight bulb and battery assembly housed within said handle.

3. The structure of claim 1, and wherein said signal means is a flashlight bulb and battery assembly housed within the rearward portion of said handle.

4. In a fishing rod handle, a forward portion, an intermediate portion and a rearward portion, said intermediate portion being offset with respect to said forward portion and said rearward portion, a lever member pivotally mounted adjacent the front end of said intermediate portion, said lever member being provided with a rearwardly extending hooked arm slidably engaging the fishing line and deviating it downwardly, switch means adapted to be actuated responsive to upward movement of said hooked arm caused by a pull on said line, and signal means on said handle controlled by said switch means.

5. The structure of claim 4, and wherein said signal means is a flashlight bulb and battery assembly housed within the rearward portion of said handle, said intermediate portion being formed to provide a seat for a reel positioned forwardly of said signal means.

6. The structure of claim 4, and wherein said signal means comprises a flashlight bulb and a battery therefor, the flashlight bulb being covered by a translucent shield.

GEORGE R. SCHWEBS.